United States Patent
Ly

(10) Patent No.: US 7,687,738 B2
(45) Date of Patent: Mar. 30, 2010

(54) WIRE FOR HIGH-SPEED ELECTRICAL DISCHARGE MACHINING

(75) Inventor: Michel Ly, Annecy (FR)

(73) Assignee: Thermocompact, Metz Tessy (FR)

( * ) Notice: Subject to any disclaimer, the term of this patent is extended or adjusted under 35 U.S.C. 154(b) by 1073 days.

(21) Appl. No.: 10/499,508

(22) PCT Filed: Dec. 20, 2002

(86) PCT No.: PCT/FR02/04515

§ 371 (c)(1),
(2), (4) Date: Jun. 18, 2004

(87) PCT Pub. No.: WO03/053621

PCT Pub. Date: Jul. 3, 2003

(65) Prior Publication Data

US 2005/0040141 A1  Feb. 24, 2005

(30) Foreign Application Priority Data

Dec. 21, 2001 (FR) .................................. 01/17052
May 27, 2002 (FR) .................................. 02/06575

(51) Int. Cl.
*B23H 1/00* (2006.01)
(52) U.S. Cl. ................ 219/69.12; 219/69.11; 219/69.15
(58) Field of Classification Search .............. 219/69.12, 219/69.11, 69.15; 428/607
See application file for complete search history.

(56) References Cited

U.S. PATENT DOCUMENTS

| | | | | | |
|---|---|---|---|---|---|
| 4,287,404 | A | * | 9/1981 | Convers et al. | 219/69.12 |
| 4,341,939 | A | * | 7/1982 | Briffod et al. | 219/69.12 |
| 4,935,594 | A | * | 6/1990 | Groos et al. | 219/69.12 |
| 4,977,303 | A | * | 12/1990 | Briffod | 219/69.12 |
| 4,988,552 | A | * | 1/1991 | Tomalin | 428/677 |
| 5,196,665 | A | * | 3/1993 | Briffod | 219/69.12 |
| 5,599,633 | A | * | 2/1997 | Miyazaki et al. | 428/675 |
| 5,945,010 | A | * | 8/1999 | Tomalin | 219/69.12 |
| 6,291,790 | B1 | * | 9/2001 | Nakai et al. | 219/69.12 |
| 2002/0195427 | A1 | * | 12/2002 | Miyoshi | 219/69.12 |

FOREIGN PATENT DOCUMENTS

| | | | |
|---|---|---|---|
| EP | 0 185 492 A2 | | 6/1986 |
| EP | 0 526 361 A1 | | 2/1993 |
| EP | 779378 A2 | * | 6/1997 |
| EP | 1 080 815 A2 | | 3/2001 |
| EP | 1080815 A2 | * | 3/2001 |
| FR | 2 418 699 | | 2/1979 |
| JP | 61130475 A | * | 6/1986 |

* cited by examiner

*Primary Examiner*—M. Alexandra Elve
(74) *Attorney, Agent, or Firm*—RatnerPrestia

(57) ABSTRACT

The invention concerns an electrode wire comprising an unalloyed copper core coated with a diffused zinc alloy coating layer, whereof the thickness is more than 10% of the wire diameter. The coating layer is optionally plated with a thin zinc, copper, nickel, silver or gold surface contact film. Such a wire achieves higher electrical discharge machining speed.

6 Claims, 3 Drawing Sheets

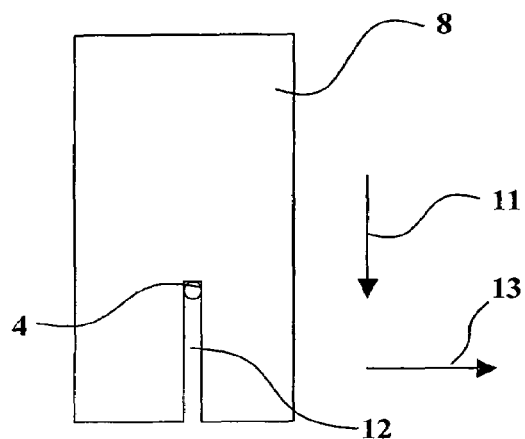
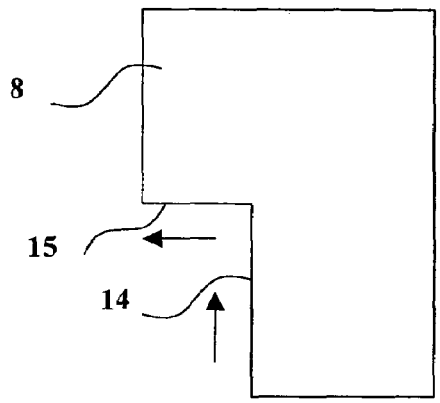
FIG.2               FIG.3
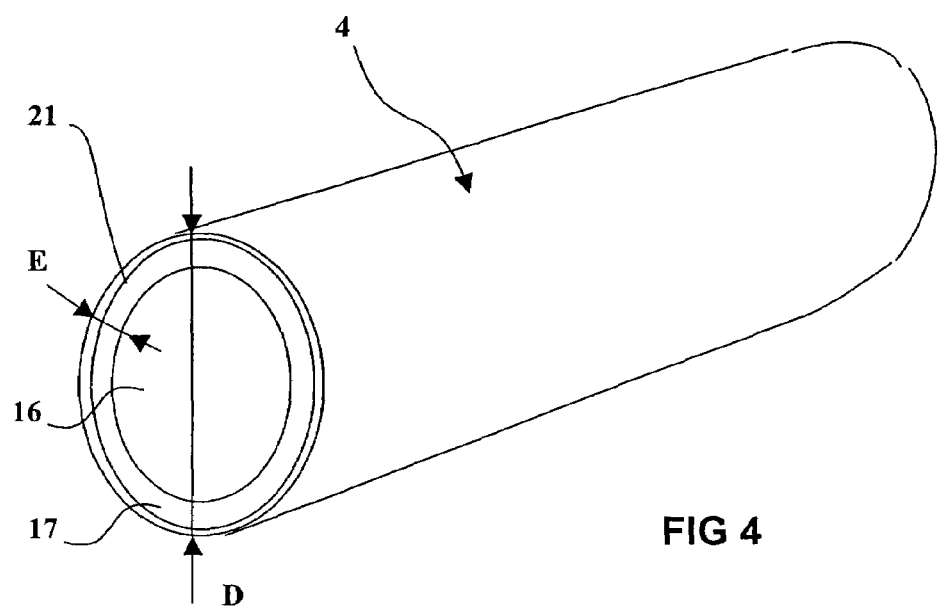
FIG 4

WIRE FOR HIGH-SPEED ELECTRICAL DISCHARGE MACHINING

This application is a U.S. national phase application of PCT International Application No. PCT/FR02/04515 filed Dec. 20, 2002.

TECHNICAL FIELD OF THE INVENTION

The present invention relates to electrode wires for spark erosion machining to cut or finish electrically conductive parts.

Spark erosion is used to machine an electrically conductive part by generating sparks between an electrically conductive wire and the part to be machined. The electrically conductive wire moves in the lengthwise direction near the part, and also moves progressively in the transverse direction relative to the part as a result of movement in translation either of the wire or of the part.

The sparks progressively erode the part and the wire. The longitudinal movement of the wire maintains at all times a wire diameter in the sparking area sufficient to prevent it breaking. The relative movement of the wire and the part in the transverse direction cuts the part or treats its surface, as appropriate.

Spark erosion machines comprise means for holding and tensioning a length of wire in the vicinity of the part to be machined in a sparking area filled with a dielectric such as water, means for moving the wire longitudinally in the sparking area, means for generating a sparking current between the wire and the part to be machined, and means for producing relative movement of the wire and the part transversely to the longitudinal direction of the wire.

There are at present many types of spark erosion wire, classified into two main families.

The wires in the first family have a generally homogeneous transverse structure, consisting of copper, brass, tungsten or molybdenum, for example. The selected alloy must satisfy electrical conductivity and mechanical strength requirements. Conductivity is necessary to feed energy into the sparking area. Mechanical strength is necessary to prevent the wire breaking in the sparking area. If possible, the alloy is chosen so that the wire has a behavior favorable to erosion, i.e. so that the wire causes fast erosion. The maximum erosion speed of a wire is the speed limit beyond which the wire breaks if the sparking energy is increased in an attempt to accelerate erosion.

As a general rule, each wire structure confers a machining rate, a machining accuracy and a surface state.

Thus brass wires containing 35% to 37% zinc have been proposed, which constitute an economically acceptable compromise, but at the cost of a relatively low erosion speed.

The second family of spark erosion wires comprises coated wires, i.e. wires consisting of a metal core coated with a surface layer that is generally a homogeneous metal or alloy layer. During spark erosion machining using these wires, the electrical arc formed through the dielectric, such as water, between the surface of the wire and the surface of the part must not reach the center of the wire, or the wire will break. It is the coating of the wire that is worn away.

The benefit of coated wires is that the core of the wire may be selected as a function of its electrical and mechanical properties, and the coating may be selected as a function of its erosion properties and its contact resistance.

Accordingly, the document FR 2 418 699 proposes coating a copper or brass core with an alloy of zinc, cadmium, tin, lead, bismuth or antimony. The document teaches that the coating increases the machining rate. The example given is a copper core coated with a coating approximately 15 µm thick for an overall diameter of 180 µm.

However, it is sometimes found that the above kind of spark erosion wire does not achieve an optimum machining rate, and there is a requirement to increase further the machining rate.

In the current state of the art of spark erosion using wires comprising a copper-based core coated with an alloy coating, it has always been recommended that copper alloys or microalloys be used to improve the mechanical properties of the wires. The benefit of improving the mechanical properties of the core, and thus the mechanical properties of the wire as a whole, is very important for obtaining straight wires that can be passed through spark erosion machines without straightening annealing, and it has always been considered that this also reduces the risk of the wire breaking during spark erosion.

Specifications of copper alloys and microalloys are in particular published in a document entitled "Les propriétés du cuivre et de ses alliages", Centre d'Information du Cuivre, Laitons et Alliages, Paris, 1992. Those properties are reproduced in the table below:

| Alloy | 0.2% proof stress (in MPa) for AFNOR state H14 or after structural hardening | IACS conductivity |
|---|---|---|
| Unalloyed copper Cu Composition as per standards | 320 tensile strength 350 | 100 |
| Copper and cadmium CuCd1 1% cadmium | 480 | 86 |
| Copper with silver CuAg 0.08% silver | 320 | 100 |
| Copper with tin CuSn0.12 0.12% tin | Tensile strength 400 | 88 |
| Copper with chromium 0.5 to 1% chromium Quenched, annealed, work hardened | 450 | 80 |
| Copper iron 2.3 phosphorus 0.03 2.3% iron, 0.03% phosphorus Quenched, annealed, work hardened | 415 | 65 |
| Copper nickel silicon CuNi2Si 1.6 to 2.5% nickel, 0.5 to 0.8% silicon Quenched, annealed, work hardened | 680 | 35 |
| Copper with beryllium CuBe2 2% berrylium Quenched, annealed | 1060 | 22 |
| Copper cobalt beryllium CuCo2Be 2.5% cobalt, 0.5% beryllium Factory hardened, high conductivity | 440 | 60 |
| Brass CuZn20 20% zinc | Approx. 400 | 32 |
| Brass CuZn35 35% zinc | Approx. 400 | 28 |

Note that adding any metal other than silver, for example cadmium or tin, significantly improves the mechanical properties of the copper, but to the detriment of the conductivity.

Thus the document EP 0 526 361 A teaches the provision of a spark erosion electrode comprising an external metal layer containing zinc around a metal core comprising copper or a copper alloy. One of the required objects is to obtain a high mechanical strength of the wire. It is obvious to the person skilled in the art that the copper used in this case is a copper microalloy. The above document further recommends doping the copper with one or more elements such as iron, cobalt, titanium, phosphorus, manganese, chromium, zirconium, aluminum, tin, nickel. The document also recommends using alloys, and the only example provided in the document is a wire whose core is of CuZn20 brass.

The document U.S. Pat. No. 4,977,303 A teaches the production of a wire with a copper core coated with zinc and then subjected to heat treatment to cause the zinc to diffuse into the copper. In this document, the person skilled in the art will realize that the copper used is not unalloyed pure copper, since FIG. 4 represents a concentration of copper, from a depth of 11 microns, in the core beyond the diffusion layer, that is clearly less than 100%, while the concentration of zinc is zero.

The document US 2001/0050269 A deprecates the use of copper alone in the core, because of its insufficient mechanical strength at high temperatures.

None of the above documents describes or suggests using unalloyed copper, i.e. copper of very high purity.

The present invention is the result of research seeking to optimize the structure of a spark erosion wire, in order to obtain a high rate of erosion.

With this in view, a first observation drawn from the document EP 0 185 492 A is that increasing the thickness of a zinc alloy coating on a copper-plated steel core is beneficial to the rate of spark erosion, but not beyond a thickness of 15 μm for a total diameter of 200 μm.

The document EP 0 526 361 A previously cited seeks a long electrode life combined with a good surface quality of the machined part. The document teaches increasing the thickness of the surface metal layer with the diameter of the wire. For a 1 mm diameter wire, the thickness of the surface layer is preferably from 10 to 100 microns. This corresponds to a relative thickness of the surface layer from 1 to 10%. The only example given in the document is a wire whose total diameter is 0.25 mm and comprises a metal surface layer 20 microns thick, which is a relative thickness of 8%. There is no teaching, in the above document, of providing a relative thickness of the surface layer greater than 10% of the diameter of the electrode wire.

A second observation is that, on some spark erosion machines, the machining rate may sometimes be further increased if the metal of the surface layer is brass obtained by thermal diffusion of zinc on the outside into an underlying layer containing copper.

This observation stems from the document U.S. Pat. No. 4,977,303 A, which proposes a spark erosion wire in which a copper alloy or microalloy core (see FIG. 4) is coated with a thick layer of a copper and zinc alloy obtained by thermal diffusion followed by wire drawing. The diffused alloy layer of copper and zinc is covered with an oxide layer approximately one micron thick. The document indicates an absolute thickness of the surface metal layer, equal to 22 microns, but gives no indication as to the relative thickness of the surface layer compared to the diameter of the wire.

In wires with a surface layer of α and β phase diffused zinc and copper alloy, it is however found that increasing the thickness of the surface layer on a brass core containing 37% zinc tends to reduce the machining rate, which is the opposite of what is required. Thus cutting tests have been carried out on a 50 mm steel part, firstly with a wire having a homogeneous brass structure containing 37% zinc, and secondly with a wire having a brass core containing 37% zinc covered with a surface layer of zinc and copper alloy produced by diffusion heat treatment. The diameters of the wires and machining conditions being identical, the relative machining rates (in $mm^2/min$) were respectively in the proportions of 98 for the homogeneous wire and 67 for the wire with a surface layer, demonstrating the negative effect of the surface layer.

It was also found that increasing the zinc content of the surface layer improved spark erosion efficiency. The surface layer-then comprises a β phase, or even a γ phase, which is harder and more rigid. However, it is not possible to increase the thickness of the surface layer, as the wire becomes brittle and difficult to draw, especially if the core is of unalloyed copper.

What is more, until now there has been no benefit in increasing the thickness of the surface metal alloy layer beyond the size of the craters that spark erosion machines produce in the surface layer of the spark erosion wire during machining. The size of these craters is approximately 5 microns, as indicated in the document U.S. Pat. No. 4,977,303. It has therefore been impossible before now to realize that it may be beneficial to increase the thickness of the surface layer beyond a relative thickness of 10% of the diameter of the usual wires, and even less so to realize that it may be beneficial to combine a fixed surface layer with an unalloyed copper core.

SUMMARY OF THE INVENTION

The problem addressed by the present invention is that of designing a new spark erosion electrode wire structure that significantly increases the spark erosion machining rate, for a given diameter, and under given machining conditions.

An object of the invention is to propose a method of fabricating this kind of electrode wire, and a machining method that increases the machining rate.

To achieve the above and other objects, the invention starts from the surprising observation that, if the core is of unalloyed copper, an increase in the relative thickness of the diffused brass surface layer produces a significant increase in the machining rate. The invention therefore provides a spark erosion machining electrode wire, comprising a metal core coated with a coating layer of diffused zinc alloy, in which:
  the core is of unalloyed copper,
  the coating layer is of diffused copper and zinc alloy,
  the relative thickness of the coating layer of copper and zinc alloy is greater than 10% of the diameter of the electrode wire.

This kind of spark erosion electrode structure is particularly well adapted to use with spark erosion machines whose electrical generators deliver a higher electrical power, enabling the benefit of the presence of a thicker surface layer to be obtained.

For example, good results may be obtained for an electrode wire diameter D of 0.20 mm, with a coating layer thickness E greater than or equal to 20 microns; for an electrode wire of diameter D equal to 0.25 mm, the thickness E of the coating layer may advantageously be greater than or equal to 25 microns; for an electrode wire diameter D of 0.30 mm, the thickness E of the coating layer may advantageously be greater than or equal to 30 microns; for an electrode wire of diameter D equal to 0.33 mm, the thickness E of the coating layer may advantageously be greater than or equal to 33 microns; and for an electrode wire of diameter D equal to 0.35 mm, the thickness E of the coating layer may advantageously be greater than or equal to 35 microns. In all cases, an increase in the spark erosion rate of approximately 30% is observed, compared to a brass or zinc-plated brass wire of the same diameter.

The copper constituting the core is unalloyed copper, the purity of which is defined in French standard NF A 51 050. According to the invention, the copper is preferably selected from the following family of recommended coppers, designated by the references used in French standard NF A 51050, with the corresponding ISO references in parentheses: Cu-a1 (Cu-ETP); Cu-a2 (Cu-FRHC); Cu-C1 (Cu-OF); Cu-c2 (Cu-OFE).

In practice, the unalloyed copper may be selected as a function of its electrical conductivity. The recommended unalloyed copper has an electrical conductivity of approximately 100% IACS, i.e. 58 MegaSiemens/meter at 20° C. At 20° C., the electrical conductivity of the unalloyed copper core, work hardened as a result of wire drawing, is of the order of 99% IACS.

The high electrical conductivity of the unalloyed copper core work-hardened as a result of wire drawing prevents excessive heating of the electrode wire during spark erosion, and thus protects it from breaking, unlike copper microalloys.

A second aspect of the invention highlights the influence of the overall conductivity of the electrode wire on spark erosion performance, and exploits this influence to increase the machining rate on the assumption that electrical energy will be supplied by more and more powerful generators.

The overall electrical conductivity of the electrode wire is the sum of the conductivities of the core and the coating layer, multiplied by their respective areas in the section of the wire. The electrode wire according to the invention has an electrical conductivity of at least 60% IACS (60% of the normalized conductivity of annealed pure copper). Failing this, a progressive reduction of the spark erosion rate is observed.

To be more precise, it has been observed that the overall electrical conductivity of the electrode wire may advantageously be from 65% IACS to 75% IACS.

Below 65% IACS, optimum spark erosion cutting performance is not achieved because of the insufficient conductivity of the electrode wire. The wire breaks more easily as a result of heating in the sparking area. This is caused by the more intense Joule effect and by reduced cooling associated with the lower thermal conductivity.

The required type of electrode wire cannot be obtained above 75% IACS, because it is then obligatory to reduce the thickness of the diffused layer below 10% of the diameter of the electrode wire. Failing this, the wire is too rigid and brittle, and must not be drawn during its fabrication.

The recommended overall electrical conductivity of the electrode wire is of the order of 69% IACS, and corresponds to a diffused layer approximately 35 μm thick for a 0.33 mm electrode wire, i.e. a relative thickness of approximately 11%. In this case, the coefficient β of variation of the overall resistivity of the electrode wire relative to temperature is 0.0034° $K^{-1}$. It must be remembered that the resistivity $R(T)$ of a wire is affected by temperature in accordance with the law $R(T)/R_0 = 1 + \beta(T - T_0)$, where $R(T)$ is the resistivity of the wire at the temperature T concerned, and $R_0$ is its resistivity at the reference temperature $T_0$.

The relative thickness values of 11% and overall electrical conductivity values of 69% IACS give good results in the range of wire diameters from approximately 0.20 mm to approximately 0.35 mm.

Two parameters are available to the operator to obtain the above conductivity values during fabrication of the electrical wire: the thickness of the layer of zinc initially deposited, and the extent of the heat treatment producing diffusion of the zinc and the copper. The operator will have no problem in making an appropriate choice of these two parameters.

The above considerations and overall electrical conductivity values have been applied successfully to the production of electrode wires with a surface layer of zinc and copper alloy whose thickness is greater than or equal to 10% of the diameter, on an unalloyed copper core.

They may also be applied with advantage to the production of electrode wires of different structure, for example with a thinner surface layer, a surface layer of other metals or alloys, multiple surface layers, on an unalloyed copper core or a core of another metal or alloy.

The advantageous and unexpected properties of wires according to the invention have been verified by experiment. A Charmilles Robofil 2020 machine was used for comparative machining of 50 mm high parts made from Z 160 CDV12 steel using the following wires, all of which had the same diameter (0.25 mm):

| Number | Core | Layer, thickness | Conductivity (% IACS) |
|---|---|---|---|
| 1 | Unalloyed copper | Diffused, 5% | 82 |
| 2 | Unalloyed copper | Diffused, 11% | 67 |
| 3 | Unalloyed copper | Diffused, 16% | 63 |
| 4 | Copper with magnesium | Diffused, 11% | 61 |
| 5 | Copper with iron, phosphorus | Diffused, 11% | 45 |

The spark erosion rate and mechanical tensile strength of each wire were tested simultaneously by carrying out machining under conditions that were made increasingly more difficult by progressively reducing the pressure of injection of water into the machining area.

Wire 1, with a thinner unalloyed copper surface layer, provided a machining rate of 145 $mm^2$/min at the maximum water injection pressure, and broke when the water injection pressure was below approximately 3.2 bar.

Wire 2 in accordance with the invention, with an 11% thick unalloyed copper surface layer, produced a machining rate greater than 168 $mm^2$/min, and broke when the water injection pressure was lower than approximately 4 bar.

Wire 3, with a 16% thick unalloyed copper surface layer, produced a higher machining rate of 171 $mm^2$/min, but broke as soon as the water injection pressure was below approximately 8 bar. A 16% surface layer of this kind may be deemed to constitute an upper limit that it is better not to exceed.

Wires 4 and 5, with an alloyed copper core, produced machining rates of 165 $mm^2$/min and 161 $mm^2$/min, respectively, but broke as soon as the water injection pressure was lower than approximately 5 bar.

The above tests demonstrate the advantageous and unexpected properties of wires according to the invention: in a way that was not obvious, the wires with alloyed copper cores, normally better at high temperature, were weaker than wires with an unalloyed copper core when machining under unfavorable cooling conditions.

The fabrication of an electrode wire as defined hereinabove may comprise the following steps:

a. providing an unalloyed copper core wire of diameter greater than the diameter of the wire to be produced, b. covering the core wire with pure zinc to an appropriate thickness, c. subjecting the coated core wire to diffusion heat treatment to form a coating layer, d. drawing the electrode wire to the final diameter, the coating layer then having a thickness greater than 10% of the final diameter of the electrode wire.

During step b, the zinc is preferably deposited on the copper core wire electrolytically.

After the diffusion step (c) or after the drawing step (d), the electrode wire may further be covered with a thin contact surface layer, for example of zinc, copper, nickel, silver or gold. This may be achieved by electrolytic deposition in particular.

In accordance with the invention, an electrode wire as defined above may advantageously be used for spark erosion machining a part. In this case, in a machine employing an electrical generator to produce the sparking electrical energy, the generator is set to produce the maximum sparking energy compatible with the machining capacity of the electrode wire without breaking, thereby increasing the machining rate.

BRIEF DESCRIPTION OF THE DRAWINGS

Other objects, features and advantages of the present invention will emerge from the following description of particular embodiments of the invention, given with reference to the appended drawings, in which:

FIG. 2 is a plan view showing the process of spark erosion in the FIG. 1 machine;

FIG. 3 is a plan view of the machined part from FIGS. 1 and 2;

FIG. 4 is a diagrammatic perspective view to an enlarged scale of one embodiment of an electrode wire of the present invention.

DESCRIPTION OF PREFERRED EMBODIMENTS

Figure 1:
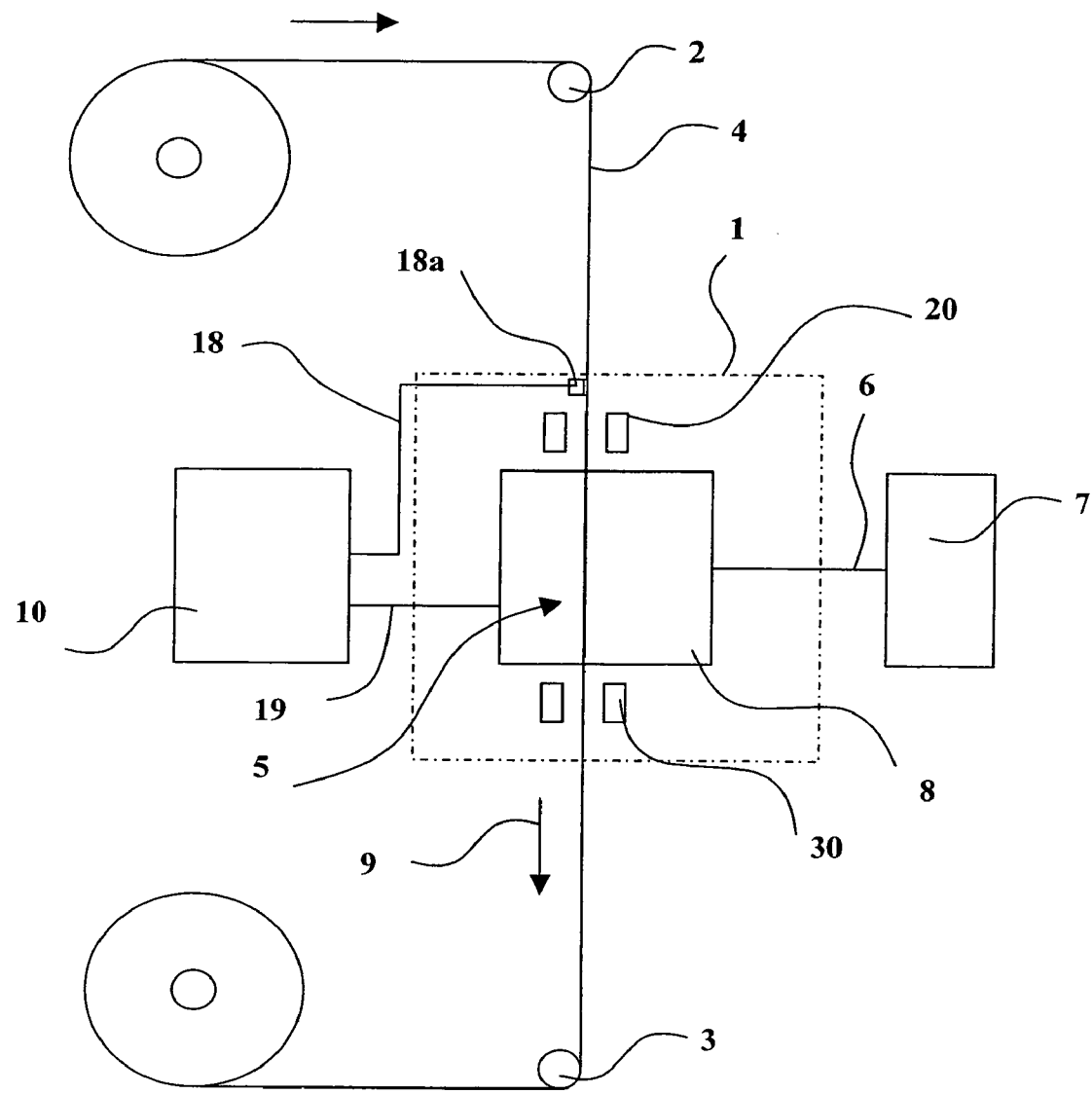
FIG. 1 is a diagrammatic front view of a spark erosion machine of the type using a wire

Consider firstly FIGS. 1 to 3, which depict spark erosion machining using an electrode wire. The spark erosion machine shown in FIG. 1 essentially comprises a machining enclosure 1 containing a dielectric such as water, means such as pulleys 2 and 3 and wire guides 20 and 30 for holding an electrode wire 4 and tensioning it in a sparking area 5 inside the enclosure 1, a work support 6, and means 7 for moving the work support 6 relative to the electrode wire 4 in the sparking area 5. The part 8 to be machined, held by the work support 6, is placed in the sparking area 5. The wire guides 20, 30 are on either side of the part 8 to be machined, and guide the electrode wire 4 accurately. To this end they are positioned close to the part 8 to be machined, and their diameter is only slightly greater than that of the electrode wire 4, for example a diameter of 254 µm for an electrode wire 4 of 250 µm diameter. The electrode wire 4 is moved longitudinally in the sparking area 5 and facing the part 8 to be machined as indicated by the arrow 9. An electrical general 10, electrically connected, on the one hand, to the electrode wire 4 by a line 18 and to a contact 18a that touches the electrode wire 4 when it enters the dielectric in the enclosure 1 between the pulley 2 and the wire guide 20, and, on the other hand, connected to the part 8 to be machined by a line 19, generates in the sparking area 5 electrical energy appropriate to cause electrical arcs to be struck between the part 8 to be machined and the electrode wire 4.

The machine comprises control means for adapting the electrical energy, the speed at which the electrode wire 4 moves, and the displacement of the part 8 to be machined as a function of the machining steps.

As can be seen in FIG. 2, by moving the part to be machined in a transverse direction shown by the arrow 11, the spark erosion process causes the electrode wire 4 to penetrate progressively into the mass of the part 8 to be machined which is electrically conductive, and produces a slot 12. Then, by moving the part 8 to be machined in the direction of the arrow 13, a perpendicular cut is produced, finally yielding a part as shown in FIG. 3, with a first machined facet 14 and a second machined facet 15.

Obviously generating high electrical energy by means of the electrical generator 10 enables fast sparking and therefore faster movement of the part to be machined relative to the electrode wire 4, for fast machining. In fact, the movement of the part must track the erosion produced by the sparks, without excess. An excessively low speed reduces the machining rate. An excessively high speed causes contact of the wire and the part, and the resulting short circuit stops the machine.

However, the electrical energy heats the wire in the machining area, and increasing this energy simultaneously increases the risks of the wire breaking. Accordingly, for a given structure of the electrode wire, the maximum machining rate is obtained for an electrical energy just below the energy that would cause the electrode wire to break.

Consider now again the tests that led to the idea of the present invention.

Spark erosion machining tests were carried out on a steel part 50 mm high in a Charmilles Robofil 2020 machine using cutting setting E3.

A first comparative test was carried out, on the one hand, with a brass electrode wire containing 37% zinc, and, on the other hand, with an electrode wire having a brass core containing 37% zinc covered with an 8 micron layer of an $\alpha$ and $\beta$ phase alloy of copper and zinc obtained by diffusion heat treatment. The two electrode wires had the same final diameter of 0.25 mm. The brass electrode wire achieved a relative machining rate of 98, whereas the electrode wire with a brass core covered with diffused zinc and copper alloy achieves a relative machining rate of only 67.

A second comparative test was carried out using, on the one hand, an electrode wire whose core was of copper and zinc alloy containing 80% copper, with a 20 micron coating layer of an $\alpha$ and $\beta$ phase diffused zinc and copper alloy, and, on the other hand, with an electrode wire with an unalloyed copper core coated with a 14 micron layer of diffused zinc and copper alloy. The two electrode wires achieved relative machining rates of 109 and 125, respectively. This demonstrates the advantage of an unalloyed copper core, which machines faster than the brass core even if the coating layer is thinner.

A third test employed in succession three 0.25 mm diameter electrode wires having an unalloyed copper core, with coating layers of diffused zinc and copper alloy 11 microns, 14 microns, and 28 microns thick, respectively. The relative machining rates obtained were 115, 125 and 133, respectively. It is seen that, for the same sparking power, a thicker diffused layer accelerates cutting, in the case of electrode wires with unalloyed copper cores.

Exploiting these results, the invention achieves a higher machining rate by using a particular electrode wire, shown to a larger scale in FIG. 4. The electrode wire according to the invention comprises an unalloyed copper core 16, coated with a layer 17 of diffused zinc and copper alloy whose thickness E is greater than 10% of the diameter D of the electrode wire.

It may be beneficial to increase significantly the thickness E of the coating layer. However, a limit is encountered in the relative deformation capacity of the metals during drawing to obtain the required final dimension of the electrode wire: too great a thickness of the coating layer leads to the risk of the wire breaking during drawing, which affects the production and use properties of the electrode wire. It remains easy to carry out drawing if the relative thickness of the coating layer is less than approximately 16% of the final diameter D. At the same time, too great a thickness E of the coating layer makes the wire brittle because of insufficient electrical conductivity.

The interface between the core and the coating layer is generally deformed by the wire drawing operation, which naturally eliminates its smooth nature and makes it slightly irregular. This irregularity is not a problem for the spark erosion process.

A contact surface layer 21 may advantageously be added to the electrode wire, for example of zinc, copper, nickel, silver or gold, to improve electrical conduction between the electrode wire 4 and the contact 18a, and make sparking more stable.

A thick layer of copper significantly reduces the spark erosion rate. To prevent this drawback, the copper layer must be extremely thin, for example less than 0.5 micron thick.

A layer of nickel appears to be too fragile to be continuous at thicknesses of the order of 1 micron.

A zinc layer of approximately 1 micron is beneficial. Even if discontinuous, this layer unexpectedly improves the electrical contact and the stability of sparking.

The surface of the electrode wire may be covered with a thin layer of oxide, resulting from fabrication process steps. It is not essential to eliminate this layer, although it is possible. This layer may be uniform or non-uniform.

The surface of the electrode wire may be cracked, without this reducing the machining rate.

The electrode wire obtained in accordance with the invention is generally yellow-brown in color.

The surface of the electrode wire must be relatively clean, with few traces of wire drawing lubricants or other soiling.

For an electrode wire as defined hereinabove, improved spark erosion properties are still obtained if the coating layer is an alloy of copper and zinc with a heterogeneous mixture of $\alpha$ and $\beta$ and/or $\beta'$ phases. The zinc content by weight is then from 35% to 57%, preferably from 35% to 50%. Tested electrode wires, that proved satisfactory, had measured zinc contents of 45.7%, 41.5%, and 35.4%, and an oxygen content of 0.5% in the form of zinc or copper oxides. The phases present in the surface layer were the $\alpha$ and $\beta$ and $\beta'$ phases of the copper-zinc diagram.

Figure 5:
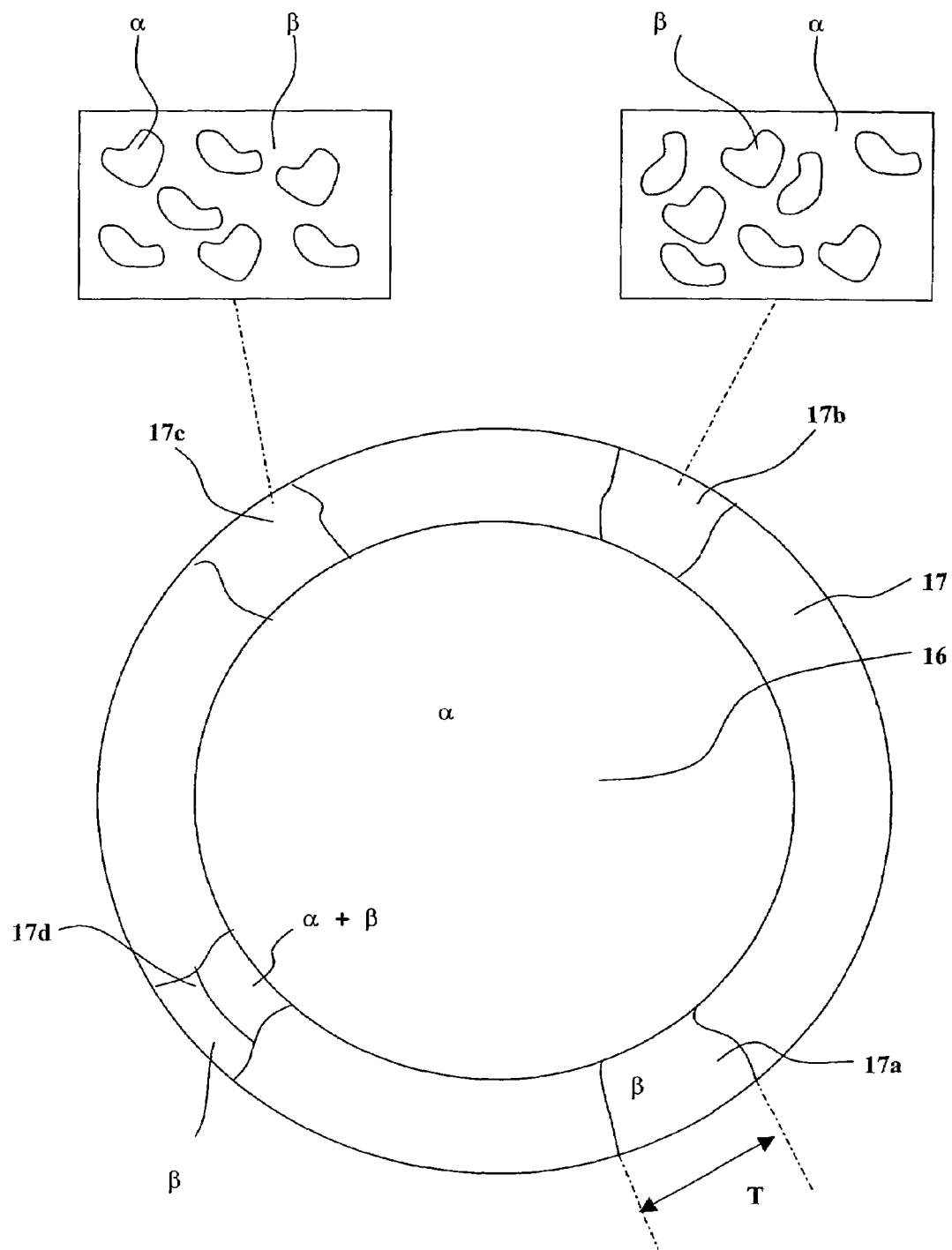
FIG. 5 is a diagrammatic view in cross section of a preferred embodiment of an electrode wire of the invention.

FIG. 5 shows diagrammatically in cross section the structure of the surface layer of a preferred embodiment of a wire of the invention. The structure is heterogeneous, in the sense that some portions of the surface layer are crystallized as phase $\beta$ or $\beta'$, from the core as far as the external surface, while other areas consist of a mixture of one phase in a matrix of another phase.

There can therefore be made out, in the figure, the unalloyed copper core 16, and the coating 17 of copper and zinc alloy whose thickness is greater than 10% of the diameter. The area 17a is of big $\beta$ phase crystal, which may have a size T from a few microns to more than 10 microns. The area 17b is an area of mixed phases $\alpha$ and $\beta$, for example, as shown to a larger scale in the box in the top right-hand corner of the figure, microzones of phase $\beta$, from 1 micron to a few microns for example, distributed in a matrix of the $\alpha$ phase. Conversely, in the area 17c, microzones of the a phase are found distributed in a matrix of the $\beta$ phase. The area 17d is a combination of a surface layer of the $\beta$ phase and a lower layer of mixed $\alpha$ and $\beta$ phases.

This kind of heterogeneous structure is obtained by an appropriate choice of heat diffusion conditions during the production of the coating layer: fast heating, appropriate diffusion time.

Heating is continued just long enough to obtain the required mixture of phases.

The benefits of this structure especially include facilitating wire drawing, despite the a priori unfavorable presence of the $\beta$ phase, with the result that it is then possible to increase the zinc content and consequently to increase the spark erosion rate.

An electrode wire according to the invention may be produced by a method comprising the following steps:

a. providing an unalloyed copper core wire of diameter D1 greater than the diameter D of the wire to be produced, b. covering the core wire with pure zinc to an appropriate thickness to produce afterwards the final thickness;

c. subjecting the coated core wire to diffusion treatment, to form a coating layer 17;

d. drawing the electrode wire to the final diameter D, the coating layer 17 then having a thickness E greater than 10% of the final diameter D of the electrode wire.

The present invention is not limited to the embodiments explicitly described and encompasses variants and generalizations thereof contained within the scope of the following claims.

The invention claimed is:

1. A spark erosion machining electrode wire comprising a metal core coated with a coating layer of diffused zinc alloy, wherein:
   the core is of unalloyed copper,
   the coating layer is of diffused copper and zinc alloy,
   the thickness of the coating layer of copper and zinc alloy is greater than about 10% of the diameter of the electrode wire, and
   the overall electrical conductivity of the electrode wire is from about 65% IACS to about 75% IACS.

2. Electrode wire according to claim 1, wherein the overall electrical conductivity of the electrode wire is of the order of 69% IACS.

3. Electrode wire according to claim 1, wherein the coating layer is of copper and zinc alloy with a mixture of $\alpha$ and $\beta$ phases, $\alpha$ and $\beta'$ phases, or $\alpha$, $\beta$, and $\beta'$ phases, and the zinc content by weight of the coating layer is from about 35% to about 50%.

4. A method of producing a spark erosion electrode wire, said wire comprising a metal core coated with a coating layer of diffused zinc alloy, wherein:
   the core is of unalloyed copper,
   the coating layer is of diffused cooper and zinc alloy, and
   the thickness of the coating layer of copper and zinc alloy is greater than about 10% of the diameter of the electrode wire, said method comprising the following steps:
   a. providing an unalloyed copper core wire of diameter greater than the diameter of the spark erosion electrode wire to be produced,
   b. coating the core wire with pure zinc to form a coated core wire,
   c. subjecting the coated core wire to diffusion heat treatment to form a coating layer,
   d. drawing the coated core wire to the final diameter, the coating layer then having a thickness greater than 10% of the final diameter of the spark erosion electrode wire, wherein the overall electrical conductivity of the spark erosion electrode wire is from about 65% IACS to about 75% IACS.

5. Method according to claim 4, wherein:
   for an electrode wire diameter of 0.20 mm, the thickness of the coating layer is greater than or equal to 20 microns,
   for an electrode wire diameter of 0.25 mm, the thickness of the coating layer is greater than or equal to 25 microns,
   for an electrode wire diameter of 0.30 mm, the thickness of the coating layer is greater than or equal to 30 microns, for an electrode wire diameter of 0.33 mm, the thickness of the coating layer is greater than or equal to 33 microns, and for an electrode wire diameter of 0.35 mm, the thickness of the coating layer is greater than or equal to 35 microns.

6. A method for machining a part by spark erosion in a machine employing an electrical generator to produce the sparking electrical enemy, the method comprising generating sparks between an electrode wire and the part, producing relative movement of the electrode wire and the part transversely to the longitudinal direction of the electrode wire, and eroding the part, wherein:

the generator is set to produce the maximum sparking energy compatible with the machining capacity of the electrode wire without breaking the electrode wire, thereby increasing the machining rate, and the electrode wire is a spark erosion machining electrode wire comprising a metal core coated with a coating layer of diffused zinc alloy, wherein:

the core is of unalloyed cooper, the coating layer is of diffused copper and zinc alloy, and the thickness of the coating layer of copper and zinc alloy is greater than about 10% of the diameter of the electrode wire, wherein the overall electrical conductivity of the electrode wire is from about 65% IACS to about 75% IACS.

* * * * *

UNITED STATES PATENT AND TRADEMARK OFFICE
CERTIFICATE OF CORRECTION

| | | |
|---|---|---|
| PATENT NO. | : 7,687,738 B2 | Page 1 of 1 |
| APPLICATION NO. | : 10/499508 | |
| DATED | : March 30, 2010 | |
| INVENTOR(S) | : Ly | |

It is certified that error appears in the above-identified patent and that said Letters Patent is hereby corrected as shown below:

On the Title Page, FIELD [56], References Cited, U.S. PATENT DOCUMENTS:
insert -- 2001/0050269 A1 12/2001 Shimojima et al. --

At Column 9, line 58, "a phase" should read -- α phase --

At Column 10, line 44, "cooper" should read -- copper --

At Column 11, line 8, "enemy" should read -- energy --

At Column 12, line 6, "cooper" should read -- copper --

Signed and Sealed this
Eighth Day of November, 2011

David J. Kappos
*Director of the United States Patent and Trademark Office*